R. W. SELLEW.
BALL BEARING.
APPLICATION FILED OCT. 19, 1920.
1,375,022.
Patented Apr. 19, 1921.
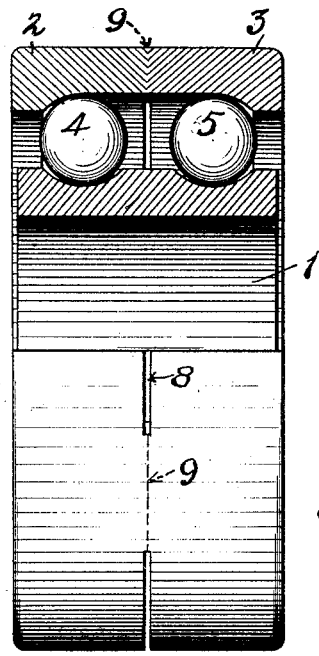
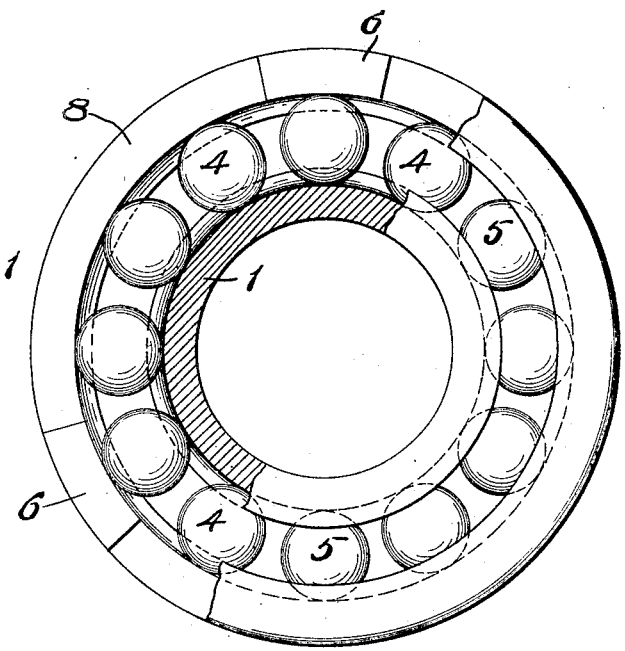
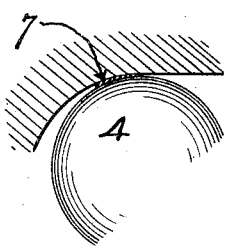
Inventor
R. W. Sellew
By his Attorneys

UNITED STATES PATENT OFFICE.

ROLAND WINCHESTER SELLEW, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

BALL-BEARING.

1,375,022.　　　　　Specification of Letters Patent.　　Patented Apr. 19, 1921.

Application filed October 19, 1920.　Serial No. 417,947.

*To all whom it may concern:*

Be it known that I, ROLAND W. SELLEW, a citizen of the United States of America, residing at New Britain, Connecticut, have invented a new and useful Ball-Bearing, of which the following is a specification.

My invention relates to ball bearings and is of particular utility when employed in a double row bearing since it facilitates the assembling of the bearing in a simple expeditious and accurate fashion.

In the drawings which show merely a preferred form of the invention—

Figure 1 is an edge elevation of a bearing partially in section and partly broken away.

Fig. 2 is a side elevation thereof partly broken away and partly in section.

Fig. 3 is a detail view partly in section.

The bearing includes two bearing rings. One of the rings preferably the outer is made in sections. 1 represents an inner bearing ring. 2—3 represent two sections making up the outer bearing ring. 4—5 represent the balls of two separate rows or series. The two bearing rings are provided with complementary race-ways in which the balls 4—5 are located. One or both of the adjacent edges of the two ring sections 2—3 have spacer or abutment shoulders 6—6. These abutments 6—6 are preferably arranged at such intervals around the bearing as to support the ring sections at at least three points.

To assemble the bearing the two ring sections 2—3 are separated sufficiently to permit the balls 4—5 to be introduced as shown in Figs. 1 and 2. The two ring sections 2—3 are then brought together until the abutments 6—6 meet. Suitable electric welding apparatus is then brought into service to cause the abutments to fuse and become welded so as to unite the two outer ring sections 2—3 as indicated at 9.

If desired, destructible shims may be placed between the balls and the race-ways as indicated in my copending application, Serial No. 383,524, filed May 22nd, 1920, so that the crowding together of the two ring sections 2—3 will not cause undue binding on the balls. One of these shims is indicated at 7, Fig. 3. After the ring has cooled, the shim 7 may be cut out or removed in any well known manner, for example, if the shim is of paper it may be removed by tearing or otherwise. If it is not desired to employ shims, the bearing rings 2—3 may be so proportioned that when the abutments 6—6 are fused the two rings will be crowded together until the intervening edges 8—8 between the abutments 6—6 meet, at which time the respective race-way grooves will properly encounter the balls. In the particular form shown in the drawings, I contemplate the use of shims, in which event the intervening edges of the ring sections 2—3 will not actually contact (see Fig. 1) but the union of the ring sections 2—3 will become complete and perfect before said intervening edges meet. By localizing the heat which is to effect the welding it is obvious that deformation or warping of the ring sections is avoided.

What I claim is:

1. In a ball bearing, two bearing rings having complementary race-ways therein, one of said rings being formed of two sections, integral spacer abutments between the edges of said ring sections, said spacer abutments being homogeneously united as by welding.

2. In a ball bearing, two bearing rings having complementary race-ways therein, one of said rings being formed in sections, integral spacer abutments on one of said sections, said spacer abutments being welded to the other section to form a bearing ring.

3. In a ball bearing, two bearing rings having complementary race-ways therein, one of said rings being formed of two sections, spacer abutments on said sections, the spacer abutments on opposing sections being welded together.

4. In a ball bearing, two bearing rings having complementary race-ways therein, one of said rings being formed of two sections, spacer abutments on said sections, the spacer abutments on opposing sections being welded together, said sections being free from each other except at the welded points.

5. In a ball bearing, an inner bearing ring having a race-way therein, an outer bearing ring having a complementary race-way therein, said outer ring being formed in sections, spacer abutments on said sections, the abutments on said sections being welded together to form the complete outer bearing ring.

ROLAND WINCHESTER SELLEW.